(12) United States Patent
Bucciarelli

(10) Patent No.: US 12,196,348 B2
(45) Date of Patent: Jan. 14, 2025

(54) DUAL-LINE SIDE BRIDGE FOR FRACTURING MANIFOLD SYSTEM

(71) Applicant: Adrian Bucciarelli, Buenos Aires (AR)

(72) Inventor: Adrian Bucciarelli, Buenos Aires (AR)

(73) Assignee: Bafter Investment S.A., Montevideo (UY)

( * ) Notice: Subject to any disclaimer, the term of this patent is extended or adjusted under 35 U.S.C. 154(b) by 27 days.

(21) Appl. No.: 17/198,216

(22) Filed: Mar. 10, 2021

(65) Prior Publication Data

US 2021/0199217 A1    Jul. 1, 2021

Related U.S. Application Data

(63) Continuation of application No. 16/813,955, filed on Mar. 10, 2020, now abandoned.

(51) Int. Cl.
*F16L 23/032*      (2006.01)
*E21B 43/26*       (2006.01)

(52) U.S. Cl.
CPC ............ *F16L 23/032* (2013.01); *E21B 43/26* (2013.01); *E21B 43/2607* (2020.05)

(58) Field of Classification Search
CPC ..... F16L 23/032; E21B 43/26; E21B 43/2607
See application file for complete search history.

(56) References Cited

U.S. PATENT DOCUMENTS

| | | | |
|---|---|---|---|
| 11,199,054 B1 * | 12/2021 | Choate | E21B 43/2607 |
| 11,454,100 B1 * | 9/2022 | Choate | E21B 33/068 |
| 2013/0284455 A1 * | 10/2013 | Kajaria | E21B 43/26 166/79.1 |
| 2019/0010781 A1 * | 1/2019 | Tran | E21B 34/025 |
| 2020/0208747 A1 * | 7/2020 | Babineaux | F16L 23/04 |
| 2020/0325752 A1 * | 10/2020 | Clark | E21B 43/26 |
| 2020/0393088 A1 * | 12/2020 | Sizemore | E21B 43/2607 |
| 2022/0090474 A1 * | 3/2022 | Clark | E21B 43/26 |
| 2022/0298903 A1 * | 9/2022 | Perkins | F16L 37/082 |

* cited by examiner

Primary Examiner — James G Sayre
(74) Attorney, Agent, or Firm — Werner IP Law, P.C.

(57) ABSTRACT

A dual line side bridge for placing a manifold and a well tree in fluid communication during fracturing operations, where multiple fluid paths reduce stress and wear while being adjustable in the horizontal and vertical planes to facilitate coupling.

14 Claims, 4 Drawing Sheets

DUAL-LINE SIDE BRIDGE FOR FRACTURING MANIFOLD SYSTEM

CROSS-REFERENCE TO RELATED APPLICATIONS

This application claims priority under 35 U.S.C. § 119(e) from U.S. Provisional Patent Application No. 62/977,556, by Adrian Bucciarelli, titled "Dual-Line Side Bridge for Fracturing Manifold System" filed 17 Feb. 2020, which by this statement, is incorporated herein by reference for all purposes.

This application also, or alternatively if necessary, claims priority to U.S. patent application Ser. No. 16/813,955, by a common inventor, Adrian Bucciarelli, titled "Single Piece Rotating Spool for High-Pressure Lines," filed 10 Mar. 2020, which by this statement, is incorporated by reference for all purposes.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The applicant presents an innovation to fracturing systems. Specially the implementation of spools to replace extensive, complex, frac iron configurations., which can clutter the worksite and cause safety issues in an already hazardous environment. Bridging spools are stronger, more reliably connected, and have larger bores. Additionally, the reduction in conduit bends preserves pressure and fluid velocity, as well as allowing the laminar flow effect to reduce scouring of equipment.

Hydraulic fracturing for hydrocarbon well stimulation has been around since the late 1940's. Technological advances to extract natural gas for unconventional reservoirs is a recent factor for widespread hydraulic fracturing in North America. But interest in the technology is not new. High volume hydraulic fracturing began in the late 1960's, and continued to gain popularity due to horizontal/directional drilling in the late 1980's, and the use of chemicals ("Slickwater fracturing") since the end of the 1990's.

The conjunction of these techniques (directional drilling, high volume fracturing, fracture divergence systems, Slickwater) with the development of multi-well pads has been especially successful in North America in the last years in their application to shales, making gas production from shales technically and economically feasible. Shale gas development is considered "unconventional" when contrasted with "conventional" subterranean natural gas reservoirs.

The technique of hydraulic fracturing makes use of a liquid to fracture the reservoir rocks. A hydraulic fracture is formed by pumping the fracturing fluid into the wellbore at a rate sufficient to increase pressure downhole to exceed the strength of the rock, (A.K.A. the tensile strength of the formation.) The term "hydraulic fracturing" is nowadays widely used to mean the process of fracturing rock formations with water-based fluids.

In general terms, 'hydraulics' is a topic in applied science and engineering that deals with the mechanical properties of liquids (not just water). Through that definition, the teachings herein would be equally applicable to any "hydraulic fracturing," and would be recognized by one skilled it the arts as relevant for all techniques (including foams and emulsions) as fracturing agents.

Directional drilling allows co-location of multiple wellheads while still accessing all areas of a deposit formation, and many times, simultaneous processing of multiple fields from a single pad site. More efficient production techniques such as fracturing, can stimulate a sluggish well bringing new life to an operation. The equipment and personnel required to hydraulically fracture ("frac") a well is expensive—estimated to be approximately thirty percent (30%) of the total cost of a well.

When completing a single well the required resources experience significant amounts of idle time. The acts of waiting for isolation plugs to set, preforming wiring, positioning, and firing of perforator gun strings, and/or conducting other wireline operations between frac cycles creates a waste of these resources that can be cost prohibitive. Co-location of multiple wellheads allows these expensive resources to be cycled between the co-located wells, eliminating idle time, and spreading cost.

The traditional collection of water tanks, chemical trucks, sand kings, bender, monitoring vans, culminate in the high-pressure fluid emanated from the missile output header. A frac manifold is downstream of the missile output header and upstream of the frac trees on the pad site. The missile output header is connected to the frac manifold which has multiple manifold outlet branches.

By coupling each manifold outlet branch to a serviced well's frac tree, the frac manifold may divert missile output to different wells as required. The frac manifold can quickly isolate wells that have completed a frac cycle and for which intervention (plug and perforate) is required. By using the frac manifold to route flow of frac fluid to another well that is prepared for the next frac cycle, it may also be possible to eliminate the delays of bleeding down and then pressuring up to move between wellheads.

In this manner a frac manifold is call a "zipper" and the operations are referred to as "zip" fracturing and is very resource efficient over previous methods. The innovations described herein eliminates frac iron to connect the frac manifold outlet module to the goat head of the serviced well. Zippers are comprised of a plurality of skid mounted modules which include one or more outlet branches, positionable relatively in front of each wellhead/frac tree.

DETAILED DESCRIPTION OF THE PREFERRED EMBODIMENTS

Figure 1:
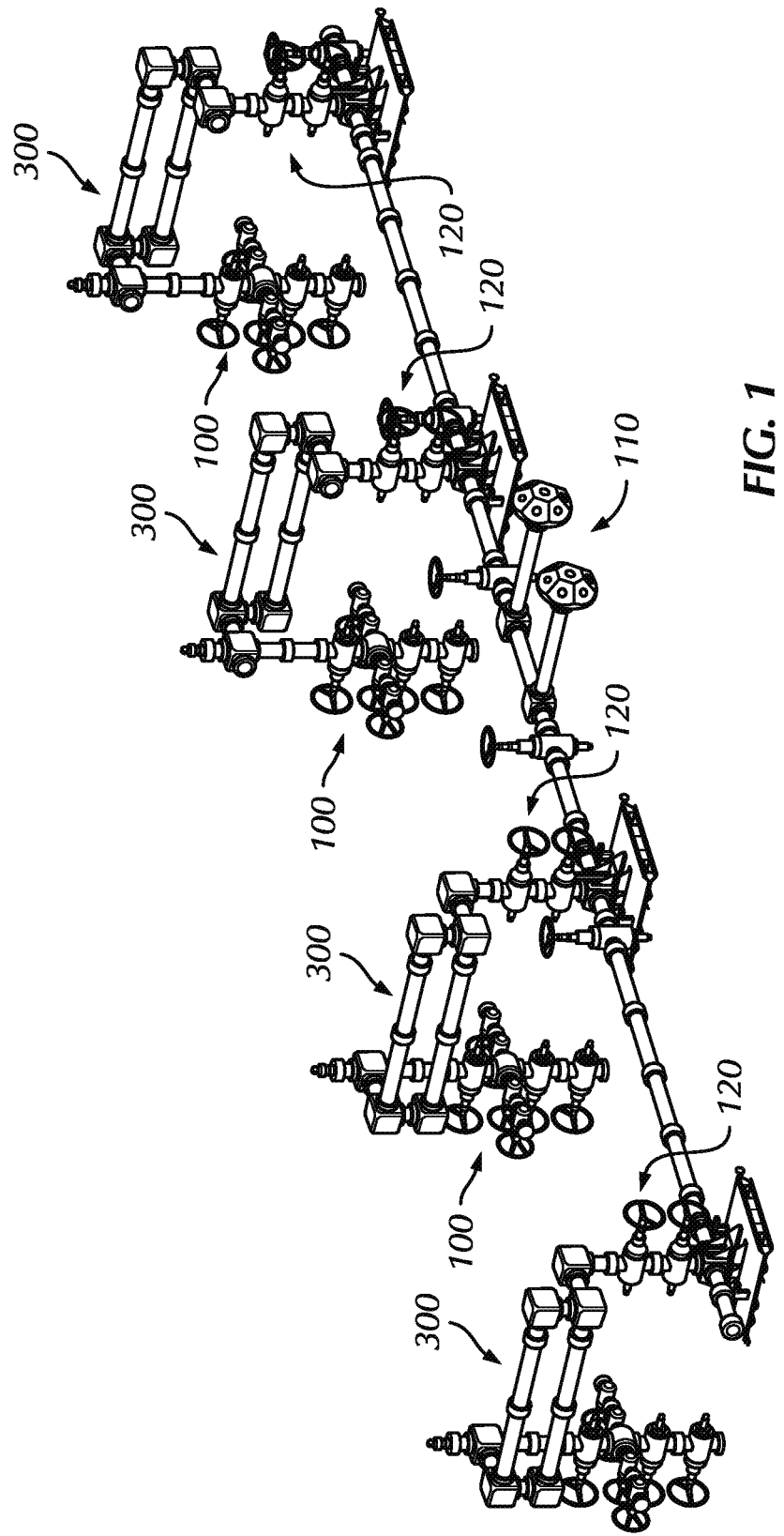
FIG. 1 shows an illustration of multiple well fracturing trees coupled to modular outlet branches of a zipper manifold with implementation of a dual-line side bridging configuration in accordance with an exemplary embodiment of the innovation.

Bridge headers have at least two openings or flanged ports oriented 90° apart, referenced herein as an input port and a header port. The input ports of the bridge headers are coupled to a modular outlet branch of a manifold or to the top of the frac tree to be serviced. Each is joined thereto by single piece adjustable spools. The spools are 'single piece' due to the high pressures involved and the abrasive high-temperature environment which can invariably lead to seal maintenance for failure prevention.

The bridge headers are squared to a centerline extending between their positions. Rotation, for squaring the two bridge headers, is provided by rotational movement of the single-piece rotating spool, hereinafter a "frac spool." The frac spool of the preferred embodiment is described in U.S. patent application Ser. No. 16/813,955, titled "Single Piece Rotating Spool for High-Pressure Lines," and is incorporated by reference above.

In this orientation, a frac spool at a bridge header's input port, allows rotation around a central axis running substantially vertically. The bridge headers' bridge ports open to the sides of a centerline between the bridge headers. The bridge port of a bridge header connects to one of the input ports of a dual line side bridge and may also utilize a frac spool to allow rotational adjustment around a central axis running substantially horizontally.

Dual bridge connectors, in this embodiment dual bridge blocks, have two openings, called bridge ports, oriented parallel to each other on a single side of the bridge end. Another single opening, called an input port, is oriented 90° apart from the bridge ports. Dual bridge blocks are joined to a side of each of the squared bridge headers such that the bridge ports of each dual bridge connector are oriented toward their common center.

The frac spools allow further alignment of the dual openings by angling up or down to accommodate differences in the bridge headers' heights. The dual bridge block connected to the modular outlet branch is then joined, via two or more bridge spools, with the dual bridge block connected to the frac tree. The bridge spools are selected to span the distance between pairs of bridge ports, placing the inputs at each end in fluid communication.

A dual bridge block is not required to be rectangular. One skilled in the arts would appreciate implementation of the innovation utilizing milled/welded metal, moldings, castings, and other constructions or assemblies applicable to the intended environment. A dual bridge connector, embodied as a dual bridge end assembly, may be comprised of a bridge block with at least two openings (an input port and a mating port), both oriented 90° apart.

That bridge block is joined to another bridge block with at least three openings (an input port, a mating port, and a bridge port), all oriented 90° apart. The pair of bridge blocks are joined at their mating ports and oriented such that the bridge ports of the pair are parallel. Similar to the configuration of the dual bridge block described above. The mating ports may be spaced apart by utilizing a short spool, or directly joined.

The dual line side bridge may be oriented on any side of the bridge headers placing the modular outlet branch in fluid communication with the frac tree. The input port of a dual bridge connector may be situated between the bridge ports. In another embodiment, the input port of a dual bridge connector is aligned with the lower of the two bridge ports, and on the other end of the bridge, the input port is aligned with the upper of the two bridge ports. This orientation can help accommodate larger height differences of the bridge headers while keeping the bridge spools more parallel to the ground to assist fluid flow.

One skilled in the art will further appreciate that the bridge method described may be extendable or expandable by mounting a second bridge to another side of the bridge header, which may be desirable for balance of forces atop the frac tree, or to reduce the required velocity and/or pressure among the bridge spools. In an alternative embodiment, a single bridge spool may be extended between the frac tree and the modular outlet branch with the frac spools providing for adjustments.

FIG. 1 shows an illustration of multiple well fracturing trees coupled to modular outlet branches of a zipper manifold with implementation of a dual-line side bridging configuration in accordance with an exemplary embodiment of the innovation. The fracturing manifold, commonly referred to as a frac manifold or a zipper (110) is comprised of a plurality of modular outlet branches (120). Each modular outlet branch (120) is associated with the well fracturing trees, or frac trees (100) of different wellbores of a multi-well site. A dual-line side bridge (300) places each modular outlet branch (120) in fluid communication with an associated frac tree (100).

Figure 2:
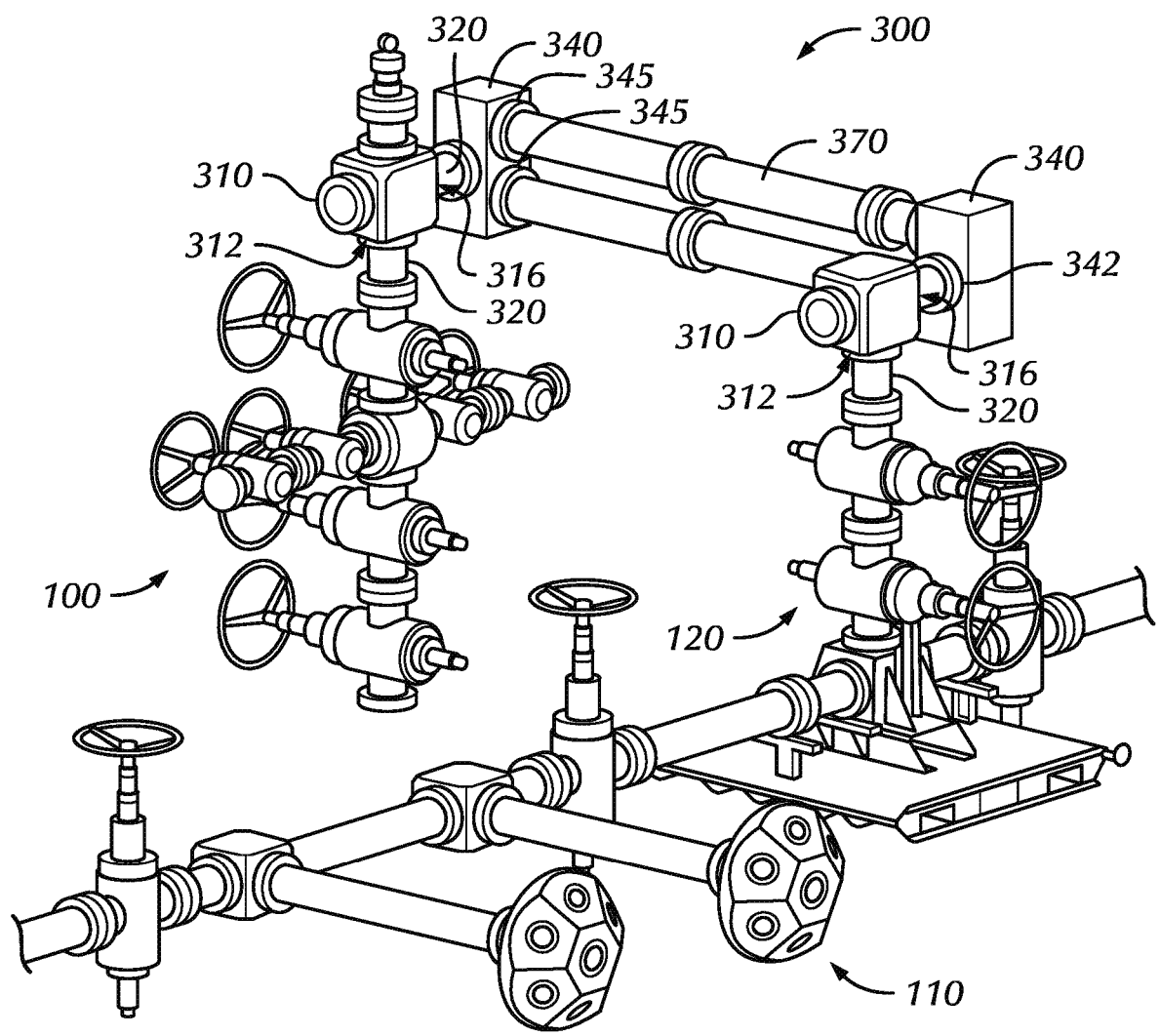
FIG. 2 shows a dual-line bridge structure implemented using dual bridge blocks, each with the input port oriented between the bridge ports in accordance with the innovation.

FIG. 2 shows a dual-line bridge structure implemented using dual bridge blocks, each with the input port oriented between the bridge ports in accordance with the innovation. The frac manifold's (110) modular outlet branch (120) is in fluid communication with the frac tree (100) by installation of a dual-line side bridge (300).

The frac manifold (110) and the modular outlet branch (120) are each joined to input port (312) of bridge headers (310) with frac spools (320) that provide limited rotational movement around a vertical axis. The rotation allows the bridge headers (310) to be squared to each other with their respective header ports (316) on a common side of the pair.

Each bridge headers' (310) header port (316) is joined, optionally by a short spool (330) or a frac spool (320), to opposing input ports (342) of a dual-line side bridge (300). The use of frac spools (320) allows for rotational movement about respective horizontal axis to angle the dual-line side bridge up or down, compensating for height differences.

The input ports (342) of the dual-line side bridge (300) are elements of dual bridge blocks (340), each having, on a side adjacent to the input port, at least two additional bridge ports (345). The respective bridge ports (345) of each dual bridge block (340) being aligned toward their common center and spanned by two or more bridge spools (370).

Figure 3:
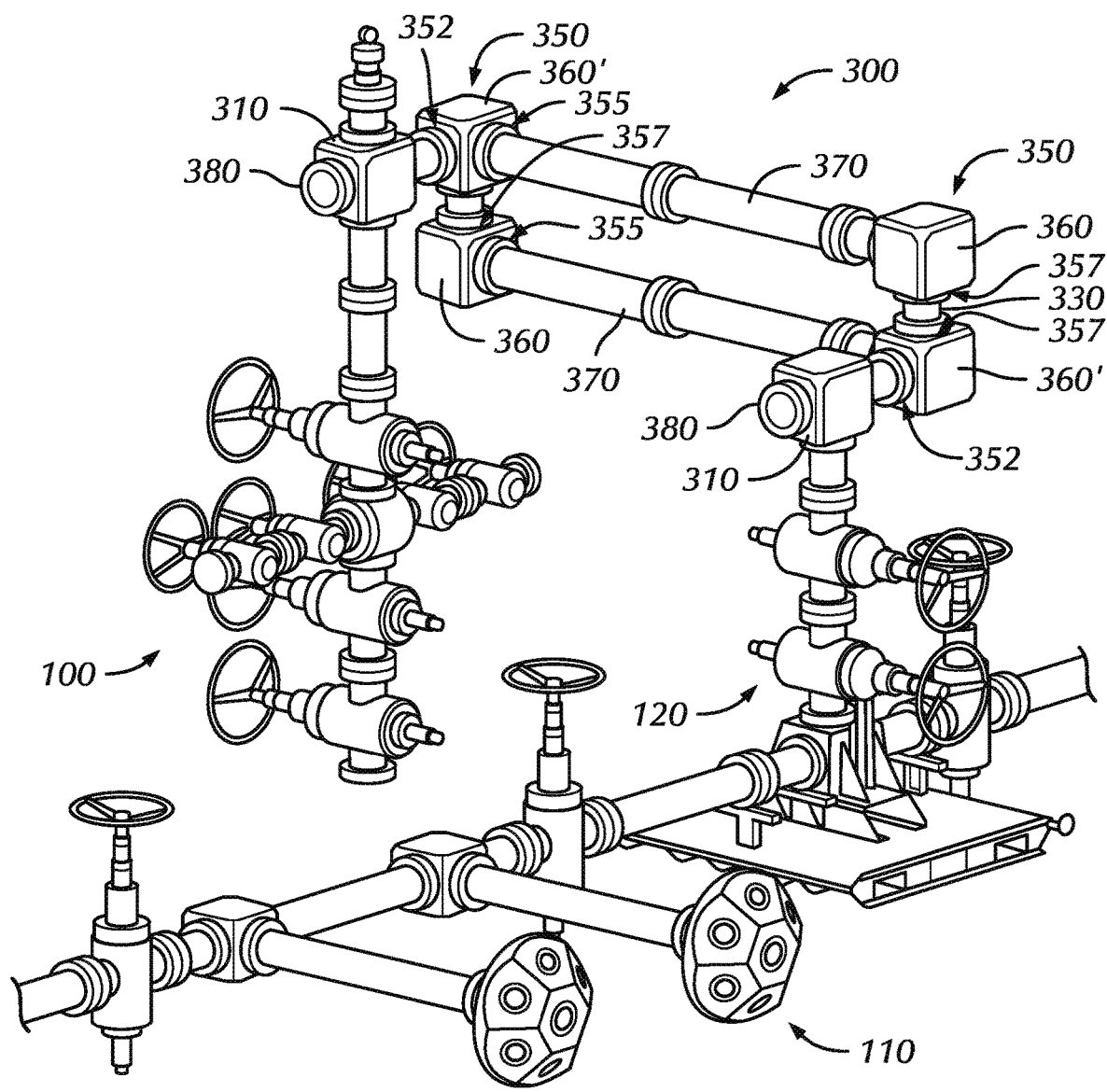
FIG. 3 shows a dual-line bridge structure implemented with a bridge assembly constructed of bridge blocks positioned and oriented to have opposed input ports in accordance with the innovation.

FIG. 3 shows a dual-line bridge structure implemented with a bridge assembly constructed of bridge blocks positioned and oriented to have opposed input ports in accordance with the innovation. The frac manifold's (110) modular outlet branch (120) is in fluid communication with the frac tree (100) by installation of a dual-line side bridge (300).

Bridge headers (310) are affixed to the modular outlet branch (120) and the frac tree (100), squared to each other with their respective header ports (316) on a common side, substantially the same as previously described. Any header openings not utilized in the opening may be closed by a valve or seal plate (380). Each bridge headers' (310) header port (316, not indicated) is joined, optionally by a short spool (330) or a frac spool (320), to opposing input ports (352) of a dual-line side bridge (300) implemented with bridge assemblies (350).

The input ports (352) of each bridge assembly (350) are elements of a bridge block (360') with at least three openings. Each input port (352), being horizontally oriented is adjacent to a bridge port (355), also horizontally oriented, but perpendicular to the input port (352). Each input port (352) is also adjacent to a vertically oriented mating port (357), making it perpendicular to both the input port (352), and the bridge port (355).

Each bridge block's (360') mating port (357) is joined, optionally by a short spool (330) to the opposing mating port (357) of another bridge block (360). This one having at least two openings. The first opening is the opposing mating port (357), also vertically oriented, and the second is an adjacent bridge port (355) oriented perpendicular to the first opening. Both bridge ports (355) of a single bridge assembly (350) are oriented perpendicular to each other and are oriented centrally with respect to the bridge assembly. The distances between respective bridge ports (355) of both bridge assemblies (350) is spanned by two or more bridge spools (370) running perpendicular to each other.

Figure 4:
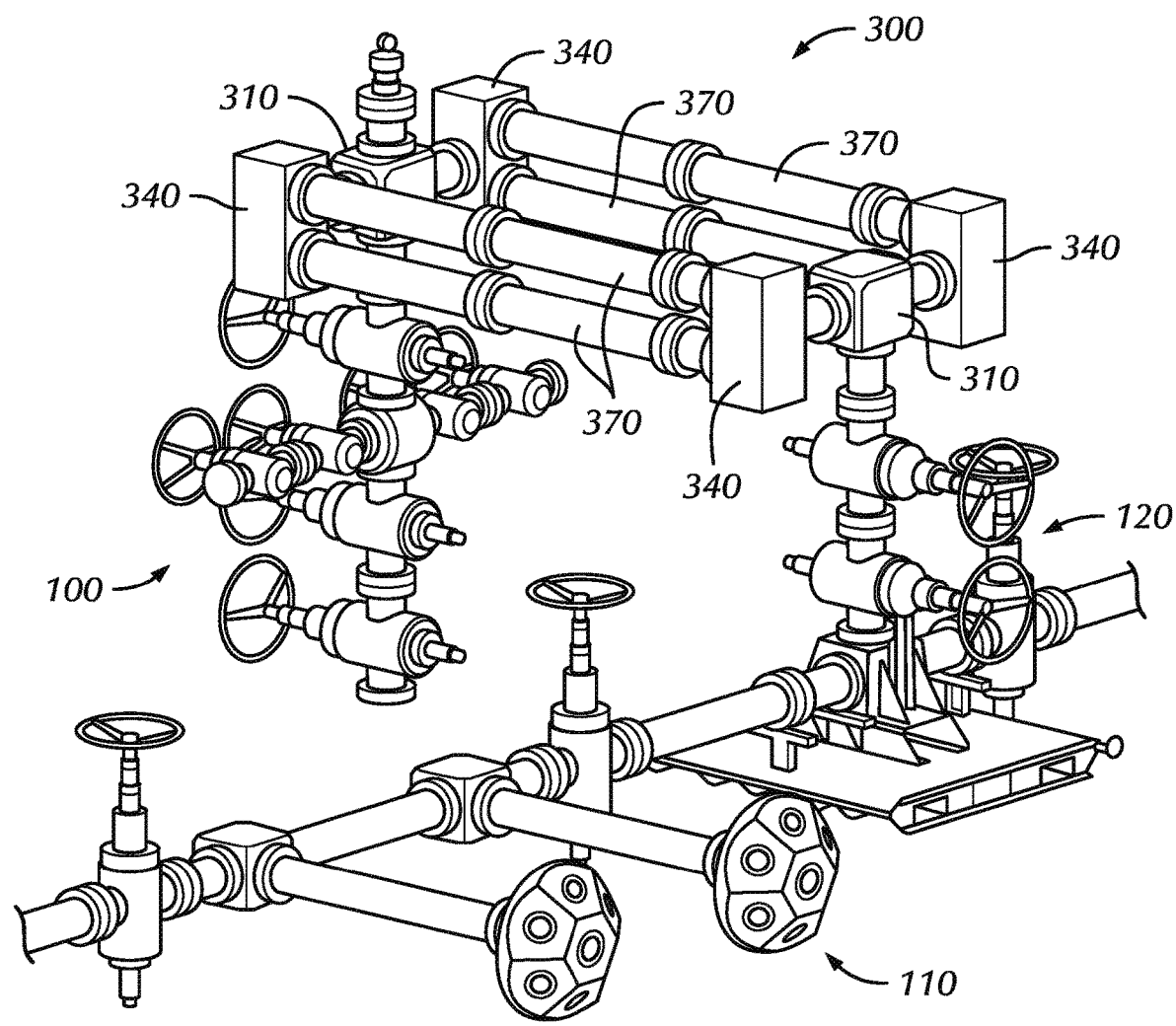
FIG. 4 shows an embodiment of an expanded side bridge configuration using multiple dual-line side bridges constructed of dual bridge blocks in accordance with the innovation.

FIG. 4 shows an embodiment of an expanded side bridge configuration using multiple dual-line side bridges constructed of dual bridge blocks in accordance with the innovation. The frac manifold's (110) modular outlet branch (120) is in fluid communication with the frac tree (100) by installation of multiple dual-line side bridges (300) by using bridge headers (310) with more than one header port (316).

Fluid entering the bridge header (310) can divide and exit through two header ports (316). After either header port (316), a dual bridge block (340) again causes fluid to divide and exit through more than one bridge ports (345), and along a plurality of bridge spools (370) which will experience less wear and stress than prior configurations.

The diagrams in accordance with exemplary embodiments of the present invention are provided as examples and should not be construed to limit other embodiments within the scope of the invention. For instance, heights, widths, and thicknesses may not be to scale and should not be construed to limit the invention to the particular proportions illustrated. Additionally, some elements illustrated in the singularity may actually be implemented in a plurality.

Further, some element illustrated in the plurality could actually vary in count. Further, some elements illustrated in one form could actually vary in detail. Further yet, specific numerical data values (such as specific quantities, numbers, categories, etc.) or other specific information should be interpreted as illustrative for discussing exemplary embodiments. Such specific information is not provided to limit the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
    a fracturing manifold comprising a plurality of manifold outlet branches;
    a fracturing tree; and
    a fluid connection communication fluid between the fracturing manifold and the fracturing tree;
    wherein the fluid connection comprises:
        a first bridge header coupled to a manifold outlet branch; and
        a second bridge header coupled to the fracturing tree;
        said first bridge header having a header port joined to a first input port of a dual line side bridge, said dual line side bridge having at least two bridge spools on the same side of said first and second bridge headers;
        said second bridge header having a header port joined to a second input port of said dual line side bridge;
    said first input port being in fluid communication with said at least two bridge spools.

2. The system described in claim 1 wherein the first bridge header is coupled to the manifold outlet branch through a single piece rotating spool allowing for rotational adjustment to align the headers to be squared to each other.

3. The system described in claim 1 wherein the second bridge header is coupled to the fracturing tree through a single piece rotating spool allowing for rotational adjustment to align the headers to be squared to each other.

4. The system described in claim 1 wherein each of the first and second bridge headers is joined to the respective first and second inputs of the dual line side bridge through single piece rotating spools allowing for rotational adjustment to compensate for bridge header heights.

5. The system described in claim 1 wherein the dual line side bridge comprises:
    said at least two bridge spools being oriented substantially parallel, joined at each end by;
    dual bridge connectors, wherein each dual bridge connector comprises:
        at least two bridge ports, opening parallel and mating to the bridge spools; and
        an input port, in fluid communication with the bridge ports, opening perpendicular to the bridge ports.

6. The system described in claim 5 wherein the dual bridge connector comprises:
    at least two bridge blocks, each having:
        a mating port oriented toward their common center,
        a bridge port, and
        one of the blocks having an input port;
    the two blocks being mated together at the mating ports;
    wherein all of the ports are interconnected and in fluid communication within the dual bridge connector.

7. The system described in claim 5 wherein each dual bridge connector comprises:
    a single connector block elongated in one direction, having the, at least, two bridge ports on a single side, opening toward a single direction; and
    an input port oriented perpendicular to the bridge ports; and
    in fluid communication with the bridge ports.

8. The system described in claim 5 wherein the input ports on each dual bridge connector of a dual line side bridge are positioned substantially opposite the other with respect to their dual bridge connectors.

9. The system described in claim 5 wherein a dual bridge connector's input port is positioned between the two bridge ports.

10. A dual line side bridge comprising:
    at least two bridge spools oriented substantially parallel, joined at each end by;
    dual bridge connectors, wherein each dual bridge connector comprises:

at least two bridge ports, being aligned with and mating to the bridge spools; and an input port, in fluid communication with the at least two bridge ports, and opening perpendicular to the at least two bridge ports.

11. The system described in claim 10 wherein each dual bridge connector comprises:

at least two bridge blocks, each having:
   a mating port oriented toward their common center,
   a bridge port, and
   one of the blocks having an input port;
the two blocks being mated together at the mating ports;
wherein all of the ports are interconnected and in fluid communication within the dual bridge connector.

12. The system described in claim 10 wherein each dual bridge connector comprises:

a single connector block elongated in one direction, having the, at least, two bridge ports on a single side, opening toward a single direction; and an input port oriented perpendicular to the bridge ports; and in fluid communication with the bridge ports.

13. The system described in claim 10 wherein the input ports on each dual bridge connector of a dual line side bridge are positioned substantially opposite the other with respect to their dual bridge connectors.

14. The system described in claim 10 wherein a dual bridge connector's input port is positioned between the two bridge ports.

* * * * *